INVENTOR.
ROBERT O. WINDER
BY
Samuel Cohen
ATTORNEY

INVENTOR.
ROBERT O. WINDER
BY Samuel Cohen
ATTORNEY

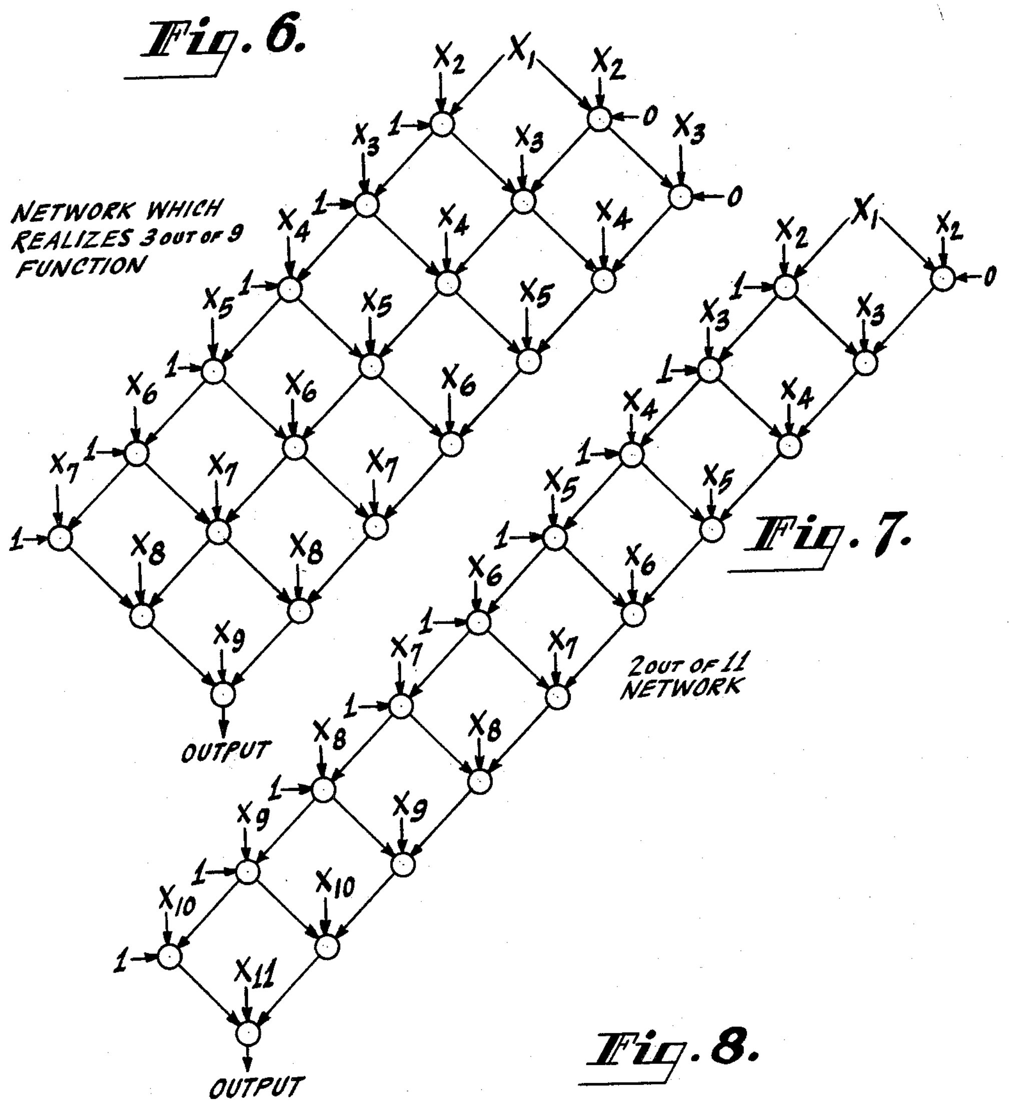
FIG. 6. FIG. 7. FIG. 8.
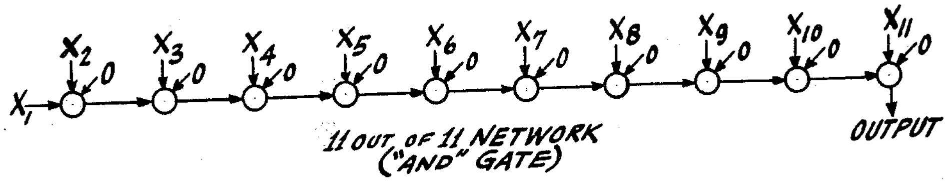
INVENTOR.
ROBERT O. WINDER
BY Samuel Cohen
ATTORNEY INVENTOR.
ROBERT O. WINDER
BY Samuel Cohen
ATTORNEY

| | $X_1,X_4,X_5,X_6,X_8 = 1$ <br> $X_2,X_3,X_7,X_9 = 0$ | | | | $X_1,X_2,X_6,X_7,X_8,X_9 = 1$ <br> $X_3,X_4,X_5 = 0$ | | | | $X_1,X_2,X_3 = 1$ <br> $X_4,X_5,X_6,X_7,X_8,X_9 = 0$ | | | |
|---|---|---|---|---|---|---|---|---|---|---|---|---|
| GATE | INPUTS | | | OUTPUT | INPUTS | | | OUTPUT | INPUTS | | | OUTPUT |
| 1/2 | 1 | 0 | 1 | 1 | 1 | 1 | 1 | 1 | 1 | 1 | 1 | 1 |
| 2/2 | 1 | 0 | 0 | 0 | 1 | 1 | 0 | 1 | 1 | 1 | 0 | 1 |
| 1/3 | 1 | 0 | 1 | 1 | 1 | 0 | 1 | 1 | 1 | 1 | 1 | 1 |
| 2/3 | 1 | 0 | 0 | 0 | 1 | 0 | 1 | 1 | 1 | 1 | 1 | 1 |
| 2/3 | 0 | 0 | 0 | 0 | 1 | 0 | 0 | 0 | 1 | 1 | 0 | 1 |
| 1/4 | 1 | 1 | 1 | 1 | 1 | 0 | 1 | 1 | 1 | 0 | 1 | 1 |
| 2/4 | 1 | 1 | 0 | 1 | 1 | 0 | 1 | 1 | 1 | 0 | 1 | 1 |
| 3/4 | 0 | 1 | 0 | 0 | 1 | 0 | 0 | 0 | 1 | 0 | 1 | 1 |
| 4/4 | 0 | 1 | 0 | 0 | 0 | 0 | 0 | 0 | 1 | 0 | 0 | 0 |
| 1/5 | 1 | 1 | 1 | 1 | 1 | 0 | 1 | 1 | 1 | 0 | 1 | 1 |
| 2/5 | 1 | 1 | 1 | 1 | 1 | 0 | 1 | 1 | 1 | 0 | 1 | 1 |
| 3/5 | 1 | 1 | 0 | 1 | 1 | 0 | 0 | 0 | 1 | 0 | 1 | 1 |
| 4/5 | 0 | 1 | 0 | 0 | 0 | 0 | 0 | 0 | 1 | 0 | 0 | 0 |
| 5/5 | 0 | 1 | 0 | 0 | 0 | 0 | 0 | 0 | 0 | 0 | 0 | 0 |
| 2/6 | 1 | 1 | 1 | 1 | 1 | 1 | 1 | 1 | 1 | 0 | 1 | 1 |
| 3/6 | 1 | 1 | 1 | 1 | 1 | 1 | 0 | 1 | 1 | 0 | 1 | 1 |
| 4/6 | 1 | 1 | 0 | 1 | 0 | 1 | 0 | 0 | 1 | 0 | 0 | 0 |
| 5/6 | 0 | 1 | 0 | 0 | 0 | 1 | 0 | 0 | 0 | 0 | 0 | 0 |
| 3/7 | 1 | 0 | 1 | 1 | 1 | 1 | 1 | 1 | 1 | 0 | 1 | 1 |
| 4/7 | 1 | 0 | 1 | 1 | 1 | 1 | 0 | 1 | 1 | 0 | 0 | 0 |
| 5/7 | 1 | 0 | 0 | 0 | 0 | 1 | 0 | 0 | 0 | 0 | 0 | 0 |
| 4/8 | 1 | 1 | 1 | 1 | 1 | 1 | 1 | 1 | 1 | 0 | 0 | 0 |
| 5/8 | 1 | 1 | 0 | 1 | 1 | 1 | 0 | 1 | 0 | 0 | 0 | 0 |
| 5/9 | 1 | 0 | 1 | [1] | 1 | 1 | 1 | [1] | 0 | 0 | 0 | [0] |

Fig. 10.

INVENTOR.
ROBERT O. WINDER
BY
Samuel Cohen
ATTORNEY

United States Patent Office 3,162,774
Patented Dec. 22, 1964

3,162,774
NETWORK FOR OBTAINING A THRESHOLD FUNCTION UTILIZING MAJORITY GATES IN AN ARRAY

Robert O. Winder, Trenton, N.J., assignor to Radio Corporation of America, a corporation of Delaware Filed Oct. 4, 1961, Ser. No. 142,873
6 Claims. (Cl. 307—88.5)

The present invention relates to networks of logic elements for performing threshold functions. While not restricted thereto, these networks are especially useful in data processing systems such as digital computers.

Logic elements employing threshold gates are in common use in the design of digital computers. For example, "and" and "or" gates are threshold gates. Threshold gates are easy to design and may be implemented in many ways—provided the number of inputs to the gates are relatively low. In the case of a five input gate, for example, there is a difference of 20% between the closest of two different input conditions. Circuits may be designed to within this tolerance at the present state of the art. However, where the number of inputs are large, there is no practical way, at present, to overcome the limits imposed by engineering tolerances. For example, the design of a 100 input gate, a gate in which there is a difference of only 1% between the closest of two different input conditions, at present, has no practical solution.

The tolerance conditions above place a severe restriction on the logical designer. He is forced to design a computer or switching network in terms of gates which have a limited number of inputs even though gates or networks with larger numbers of inputs, if available, might provide a much better system.

The object of the present invention is to provide networks which can realize any arbitrary threshold function.

The elementary building blocks of the present invention are majority gates. A majority gate is defined as one which produces an output which is equal to the majority of its inputs. The principles of the invention are applicable to the use of three input, five input, seven input or higher number input gates. The gates are arranged in a regular network in a way discussed in greater detail below and the network can realize any desired threshold function. The fact that the networks are regular is an important advantage as it permits the network easily to be manufactured as, for example, in batch processes.

The invention is described in greater detail below and is illustrated in the following drawings of which:

FIG. 6 is a schematic drawing of a network which realizes a 3 out of 9 threshold function;

FIG. 7 is a schematic drawing of a network which realizes a 2 out of 11 threshold function;

FIG. 8 is a schematic drawing of a network which realizes an 11 out of 11 threshold function;

FIG. 10 is a table to help explain the operation of the network of FIG. 3.

The definitions and general discussion which follows are helpful in understanding the figures above.

Figure 1:
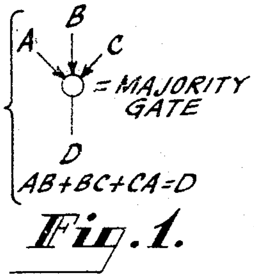
FIG. 1 is a diagram of a majority gate and the Boolean equation for the gate.

An elementary building block employed throughout the figures is a majority gate. This gate is well-known and may be implemented with diodes, transistors, magnetic devices, cryoelectric circuits, or in other ways. A majority gate has an odd number of inputs. It produces an output which is equal to the value of the majority of the inputs. The Boolean equation for majority gate having inputs A, B and C and an output D is given in FIG. 1.

As implied above, a majority gate receives signals indicative of binary bits and produces an output signal indicative of a binary bit. When an input or output signal is at one level, it represents the binary bit "one" and when it is at another level, it represents the binary bit "zero." To simplify the discussion, rather than speaking of electrical signals applied to gate elements in a network, it is sometimes stated hereafter that a "one" or a "zero" is applied to the gate or network.

The networks of the present invention realize threshold functions. A typical threshold function may be a $t$ out of $n$ function. $n$ represents the total number of "arguments" or inputs. $t$ is a number not larger than $n$ and represents the least number of arguments which must have the value 1 to produce a result of 1. In terms of a physical circuit, $n$ represents the number of inputs indicative of binary digits applied to the circuit; $t$ is the smallest number of inputs representing the binary bit "one" required to produce an output indicative of a "one." A $t$ out of $n$ threshold function is sometimes written $t/n$ in the discussion which follows.

Throughout the figures capital letters are used to represent signals indicative of binary bits. For example, $X_2$ may represent the binary bit "one" or the binary bit "zero."

For the sake of drawing simplicity, the invention is illustrated in most of the drawings in terms of networks in which $n$, the number of inputs, is 11 or less. However, it should be appreciated that $n$ can be any arbitrarily large number such as 100 or much more than 100 and it is intended that the simplified drawings not be construed as limiting the invention to networks in which $n$ is a relatively small number.

Figure 2:
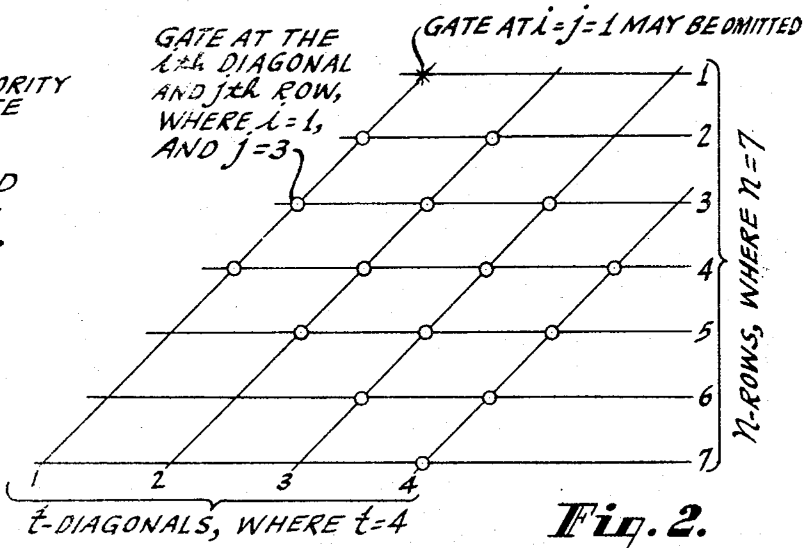
FIG. 2 is a drawing which is useful in explaining the operation of the invention.

The networks of the present invention are made up of elements (gates) arranged in rows and diagonals as illustrated schematically in FIG. 2. There are $n$ rows of elements and $t$ diagonals shown and each diagonal, except the first, has $(n-t+1)$ elements. These elements are represented as circles in FIG. 2.

The first element in each diagonal is the one in the $j$th row in which $j=i$. $j$ is a parameter which represents one of the $n$ rows and, in the example shown, can have any value from 1 to $n$. $i$ is a parameter which represents one of the diagonals and, in the example shown, can have a value from 1 to $t$. As an example of this nomenclature, the second element on the second diagonal is in row 3. This element lies at the intersection $i=2$, $j=3$ and is sometimes referred to as gate 2/3.

The last element on each diagonal, in the example shown, is located in the row in which $j=n-t+i$. For example, the last element in the third daigonal lies in row 6. Substituting in the formula, $j=n-t+i=7-3+3=6$, i.e., the last element in the third diagonal lies in the sixth row.

Figure 3:
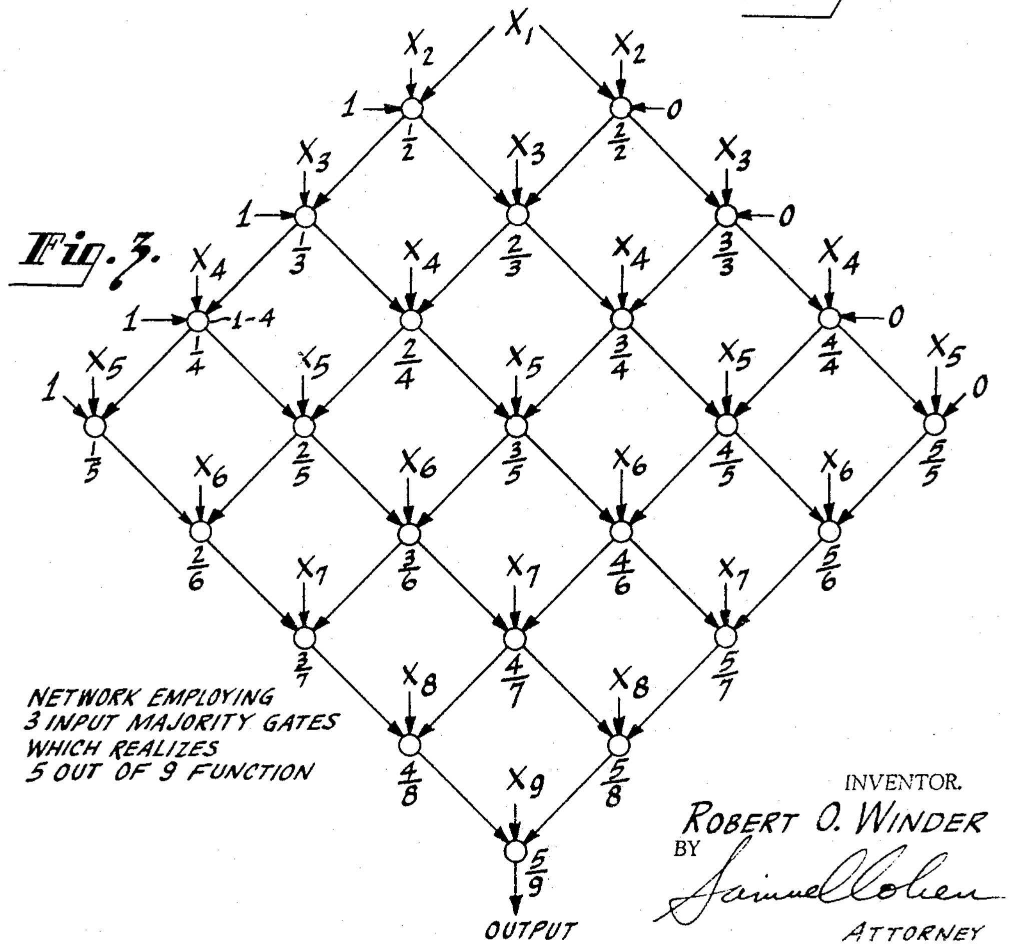
FIG. 3 is a schematic drawing of a network which realizes a 5 out of 9 threshold function.

A practical network according to the present invention is shown in FIG. 3. This network is one made up of three-input majority gates and it realizes the threshold function 5 out of 9 (therefore, $t=5$ and $n=9$). There are nine rows of elements and five diagonals of elements. It may be seen from FIG. 2 that the element in the first diagonal and first row is missing. This will be explained later.

The nine inputs to the network of FIG. 3 are legended $X_1$–$X_9$. The inputs $X_1$ and $X_2$ are applied to the elements in the second row. The inputs $X_3$ are applied to the elements in the third row. The inputs $X_4$ are applied to all elements in the fourth row. The inputs $X_5$ are applied to all elements in the fifth row and so on. In the general case of networks employing three-input majority gates, it may be stated that the gates in the $j$th row receive as one input the $j$th one of the $n$ input signals.

A gate such as the one legended 3/5 receives as a second input the output of a gate in the preceding row and same diagonal (the gate legended 3/4), and as a third input, the output of a gate in the preceding row and the preceding diagonal (gate 2/4). In the general case of networks employing three-input majority gates, it may be stated that the gate at the intersection of the $i$th diagonal and $j$th row (the $ij$ gate) receives a signal from the gate at the intersection of the $i$ diagonal and the $j$–1 row and also a signal from the gate at the intersection of the $i$–1 diagonal and the $j$–1 row.

The limiting case of the rule expressed immediately above is the one in which the gates lie at $i=j$ (gates 2/2, 3/3, 4/4 and 5/5) and the gates on diagonal $i=1$ (gates 1/2, 1/3, 1/4 and 1/5). For the case in which $j=i$, a signal indicative of the binary bit "zero" is applied to the $i/j$ gate rather than a signal from a gate at the $i$ diagonal and the $j$–1 row. For example, in the case of the 3/3 gate, there is no gate on the third diagonal and second row. Accordingly, the binary bit "zero" is applied to the 3/3 gate instead. In the case in which $i=1$, a signal indicative of the binary bit "one" rather than a signal in the $i$–1 diagonal is applied to the $i/j$ gate. For example, in the case of the gate 1/4 which appears on the first diagonal, there is no diagonal to the left of the first diagonal and accordingly, there is no gate in row 3 to the left of the 1/3 gate. Accordingly, a 1 is applied to the 1/4 gate rather than a signal from the non-existent 0/3 gate.

In the network of FIG. 3, the gate at the apex of the network may be omitted or may be present. If the gate were present, it would receive as its three inputs 1, $X_1$ and 0. Accordingly, the output of this gate would equal the value of $X_1$. Since the output and input of this gate would be equal, this gate may be omitted and $X_1$, instead, applied directly to the gates in the second row as is shown in FIG. 3.

The legends applied to each gate refer to the function they perform individually with respect to the input variables. For example, the gate legended 1/2 produces a 1 output when either one or both of the two preceding variables which affect the gate have the value 1. In Boolean terms, the equation for this gate is $X_1+X_2$. The gate legended 2/2 produces a 1 output only when two of the two preceding variables are equal to 1. In Boolean terms, the equation for this gate is $X_1X_2$. As a third example, the gate legended 3/4 produces a 1 output only when three or more of the four preceding variables are 1. In Boolean terms, this gate performs the function $$X_1X_2X_3+X_1X_2X_4+X_1X_3X_4+X_2X_3X_4$$

Coincidentally, as pointed out above, the legend applied to each gate refers to the diagonal and row in which each gate is located. For example, the 1/2 gate is located on the first diagonal and second row. The 4/6 gate is located on the fourth diagonal and sixth row.

It can be proved mathematically that the network of FIG. 3 realizes the 5 out of 9 function. However, the operation of the network may perhaps more clearly be understood by giving specific examples. This is done in the table of FIG. 10. Three random samples of values for the input variables have been chosen for illustration.

In the first case, five of the nine variables are 1 and remaining four are 0. The network output is shown to be 1. In the second case, six of the input variables are 1 and the remaining three are 0 and again the network output is shown to be 1. In the last case, three of the variables are 1 and the remaining six are 0 and the network output is shown to be 0.

Figures 4, 5:
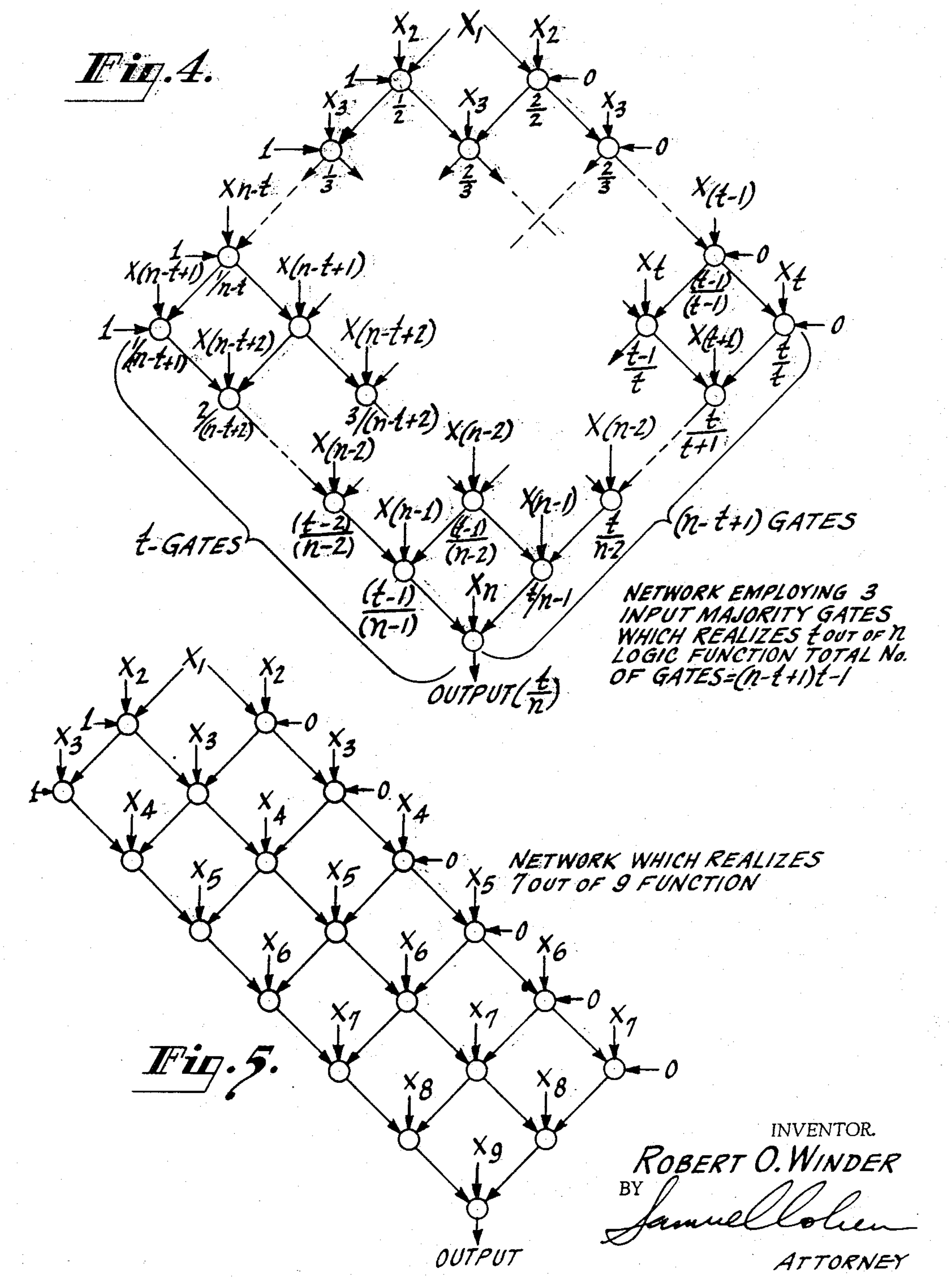
FIG. 4 is a generalized schematic drawing of a network employing three input majority gates which realize a $t$ out of $n$ logic function.
FIG. 5 is a schematic drawing of a network which realizes a 7 out of 9 threshold function.

A drawing of a three input majority gate logic network for realizing any threshold function ($t$ out of $n$) is shown in FIG. 4. As in the network of FIG. 3, the majority gate at the apex of the network (the gate at one corner of the rectangular array) may be omitted. The elements in succeeding rows received the succeeding input binary variables, respectively. The elements at the upper right edge of the network each receive binary "zero" as one input. The elements at the upper left edge of the network each receive binary "one" as one input. The right corner element of the array is the one in row $t$ and it receives $X_t$ as its input. The element in the left corner of the array is in row $n-t+1$ and it receives the input variable $X_{(n-t+1)}$. The output of the network is taken from the element in the last row of the array. This output is $t$ out of $n$. The total number of gates in the network is $(n-t+1)t-1$.

FIG. 5 shows a network designed in accordance with the teachings of FIG. 4 which realizes a 7 out of 9 threshold function. This network employs three input majority gates. The operation of this network can easily be deduced from the previous discussion of FIG. 3 and it can also be proved mathematically.

FIG. 6 shows a network designed according to the teachings of the invention which realizes a 3 out of 9 function. Three input majority gates are employed.

FIGS. 7 and 8 have been included to show the generality of the present invention. The network of FIG. 7 which employs three input majority gates realizes a 2 out of 11 threshold function; the network of FIG. 8 which also employs three input majority gates, realizes an 11 out of 11 network. The network of FIG. 11 is, of course, an "and" gate. The limiting case in the other direction, namely 1 out of 10 is, of course, an "or" gate and is easily realizable according to the teachings of FIG. 4.

All of the networks discussed so far realize odd threshold functions. The invention is, however, general and can realize even threshold functions as well. The design follows from the general drawing of FIG. 4.

It is possible to use practical gates having greater than three inputs in the networks of the invention. An important advantage of networks employing gates having more than three inputs is that the total number of gates in the network can be reduced. The way in which such networks may be designed is discussed more fully below in connection with FIG. 9.

In general, to make a network in which majority gates having greater than three inputs are employed, the following procedure is followed. Let $m$ equal the number of inputs to each gate. As already discussed, for a majority gate as defined here, $m$ is an odd number. Next, the network for realizing the desired threshold function is drawn employing the three input gates already discussed. For example, if it is desired to realize a 5 out of 9 threshold function, the network of FIG. 3 is drawn. Solve the equation $$k=\frac{m-1}{2}$$

In the illustrative case of $m=5$, $k=2$. A check is then placed next to the bottom row of the network (the ninth row in the case of FIG. 3), and then working upwards every $k$th row thereafter is checked. If, for example, $m=5$, every other row is checked. If $m=7$, every third row is checked and so on. Next, all of the gates in each unchecked row are deleted. The new inputs to any gate are:

(1) The X input signal which previously entered the gate.

(2) The X input signal which previously entered the gate in the preceding rows which have been deleted.

(3) The outputs of the gates of the new row (now immediately above) which in the old network influenced this gate.

(4) If a gate is too near the upper right or the upper left (or both) edges of the network, there will not be a sufficient number of appropriate gates in the row preceding it to provide $m$ inputs to that gate. In this case, a zero is supplied for each input called for from a non-existent gate to the right of the network, a one is supplied for each input called for from a non-existent gate to the left of the network; in the case in which the gate is equidistant from the upper right and left edges, equal numbers of ones and zeros are applied so that the ones and zeros offset each other.

Figure 9:
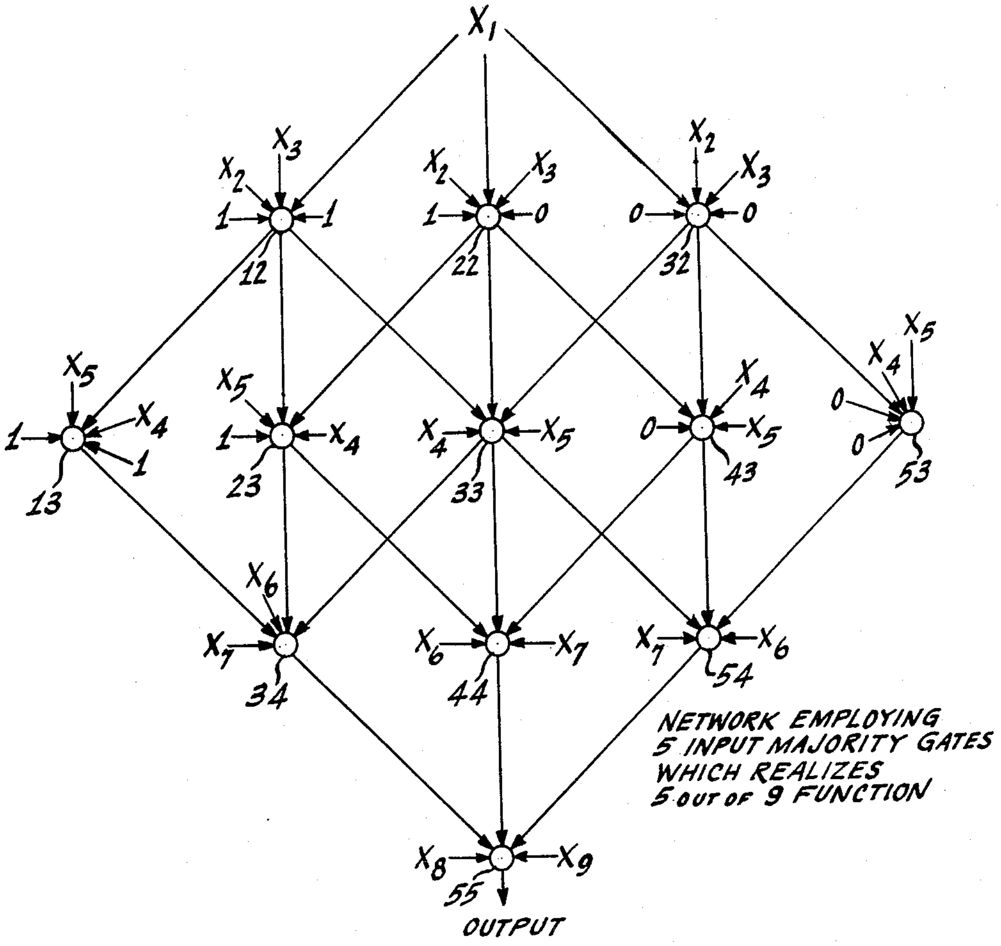
FIG. 9 is a schematic drawing of a network employing five input majority gates which realize a 5 out of 9 threshold function.

A network designed in accordance with the procedure above is illustrated in FIG. 9. This figure shows a network employing five input majority gates which realize a 5 out of 9 function. Comparing FIG. 9 with FIG. 3, it may be seen that the eighth, sixth, fourth, and second row of the network of FIG. 3 have been deleted. An element such as 32 (diagonal 3, row 2) which corresponds to element 3/3 of FIG. 3 receives as inputs $X_3$, $X_2$, $X_1$, 0 and 0. $X_3$ and 0 were inputs it previously received. $X_2$ is the input which was formerly applied to the 2/2 gate in the preceding row. $X_1$ is an input which influenced the output of former gate 2/2 and the output gate of 2/2 influenced the gate 3/3. Accordingly, the input $X_1$ indirectly influenced the output of the 3/3 gate. For this reason $X_1$ must be applied to gate 32—the gate corresponding to the 3/3 gate. Since gate 32 is at the upper right edge of the network, there is no fifth input available from a gate which is above and to the right of gate 32. There is, therefore, substituted for this missing input the input zero since the missing gate is to the right of the network.

Gate 22 in FIG. 9 corresponds to the 2/3 gate of FIG. 3. Gate 22 receives as inputs $X_1$, $X_2$ and $X_3$. Again $X_3$ was received formerly by the 2/3 gate. $X_2$ was applied formerly to the gates in the row which is now deleted, that is, the second row. $X_1$ formerly influenced the 2/3 gate. As gate 22 is a five input gate, two more inputs must be supplied. Since this gate is equally distant from the upper right and left edges, the binary bits "one" and "zero" are applied to gate 22.

To further illustrate the invention, gate 44 may be chosen. Gate 44 corresponds to the 4/7 gate of FIG. 3. Gate 44 receives as inputs $X_7$ and $X_6$. $X_7$ was formerly applied to the 4/7 gate; $X_6$ is the input which was formerly applied to the sixth row (now deleted). The remaining three inputs to gate 44 come from gates 23, 33 and 43. The outputs of the corresponding gates of FIG. 3, namely 2/5, 3/5 and 4/5 indirectly influenced the 4/7 gate in FIG. 3 corresponding to gate 44. Accordingly, the outputs of gates 23, 33 and 43 must be applied to gate 44.

It can be shown mathematically that the output of the network of FIG. 9 realizes a 5 out of 9 function. Note that there are substantially fewer gates in the network of FIG. 9 than the one of FIG. 3. There are 12 gates in the network of FIG. 9, 24 gates in the network of FIG. 3.

The preceding discussion deals with a number of specific networks employing three input gates, a generalized network employing three input gates, and a specific network employing five input gates. The rules which follow are perfectly general and are applicable to the design of any network employing majority gates regardless of the number of inputs to the gates. The symbols employed are:

$n$=total number of inputs (arguments).
$t$=no more than $n$ and is the number of inputs which must be 1 to produce a 1 output from the network.
$m$=the number of inputs to each majority gate in the network.

$$k=\frac{m-1}{2}$$

$$q=\left[\frac{n-1}{k}\right]$$

where [] implies that if the term is not an integer, $q$ is equal to the next lower integer.
$j$=the row in which a gate is located.
$i$=the diagonal in which a gate is located.

For a particular gate $ij$ (1) The range in the values of $j$ which are possible:

$$1\leq j\leq q+1$$

(2) The range in the values of $i$ which are possible:

$$\max[1,t-(q-j+1)k]\leq i\leq\min[n-(q-j+1)k,t]$$

where:

max $[d,e]$ means select the one of $d$ and $e$ which has the greater value, and
min $[d,e]$ means select the one of $d$ and $e$ which has the smaller value (3) For $j=1$, the inputs to gate $i$, 1 are:

(a) The signals $X_1, X_2 \ldots X_{n-qk}$, where the total number of signals is $(n-qk)$
(b) $(k-i+1)$ constant 1 signals, and
(c) $[(q+1)k-n+i]$ constant 0 signals (4) For $j>1$, the inputs to gate $i,j$ are:

(a) The $k$ signals (where $k$ refers to the total number of signals)

$$X_{n-(q-j+2)k+1}, X_{n-(q-j+2)k+2} \ldots X_{n-(q-j+2)k+k}$$

(b) The outputs from the $k+1$ gates:

$$(i-k, j-1), (i-k+1, j-1) \ldots (i, j-1)$$

(5) In the case in which the values of $i$ and $j$ are such that the gates which satisfy the expressions in 4b above do not exist (because the $i$-value is out of range):

(a) Whenever the $i$-value is less than 1 (out of range to the left) supply instead a constant 1 signal;
(b) Whenever the $i$-value is greater than the $j$ value (out of range to the right) supply instead a constant 0 signal.

(6) In any case when the X input to a gate is equal to its X output, that gate may be omitted, and said X input supplied instead to the gates to which the output of the omitted gate would have been applied.

The desired output $t/n$ is taken from the gate at $(i=t, j=q+1)$.

The rules above can be proved mathematically; however, the mathematics is somewhat involved and need not be discussed here. Instead, it is shown below how the rules apply to a specific gate in one of the networks which is illustrated, namely gate 43 in the network of FIG. 9. (The rules apply, of course, to all gates in all networks shown.) Applying the rules above to this gate:

$n=9$
$t=5$
$m=5$
$k=2$
$q=4$
$j=3$
$i=4$ (1)
$$1\leq j\leq q+1$$
$$1\leq j\leq 5$$

Put into words, the values 1 through 5 are possible for $j$. This checks.

(2)
$$\max[1,t-(q-j+1)k]\leq i\leq\min[n-(q-j+1)k,t]$$
$$\max[1,1]\leq i\leq\min[5,5]$$

Put into words, there are five possible diagonals $(i)$ namely 1–5, on which a gate in the third row $(j=3)$ may lie. This checks.

(3) For $j=1$, the total number of input signals is $n-qk=1$. This checks.

(*a*) These signals are $$X_1 \rightarrow X_{n-qk}$$
$$= X_1 \rightarrow X_1$$
$$= X_1$$

(*b*) $(k-i+1)$ constant 1 signals $$=(2-1+1)=2 \text{ constant 1 signals}$$

(Note that when $j=1$, $i=1$)

(*c*) $[(q+1)k-n+i]$ constant 0 signals $$=2 \text{ constant 0 signals}$$

Summarizing, the gate in row 1 has as inputs: 0,0,1,1,$X_1$. Since the two zeros offset the two ones, the output of this gate is $X_1$ and this is equal to the input signal $X_1$ to the gate. Accordingly, the gate in row 1 may be omitted (see 6 above). This checks with FIG. 9 in which the gate in row 1 is omitted.

(4) for $j>1$ (in this case $j=3$) the inputs are:

(*a*) The $k$ (in this case 2) signals $$X_{n-(q-j+2)k+1}, X_{n-(q-j+2)k+k} = X_4, X_5$$

This checks with FIG. 9.

(*b*) The outputs from the $k+1$ (in this case 3) gates $$(i-k, j-1), (i-k+1, j-1), (i, j-1)$$
$$=(i=2, j=2), (i=3, j=2), (i=4, j=2)$$

$i=2, j=2$ corresponds to gate 22
$i=3, j=2$ corresponds to gate 32
$i=4, j=2$ is absent.

Therefore, substitute 0 for this input to gate 43, as required by 5*b* above, since $j>i$. This also checks with FIG. 9 because gate 43 in FIG. 9 receives as inputs the outputs of gates 22 and 32, and 0.

The various networks illustrated and discussed above realize $t$ out of $n$ threshold functions. The networks are shown as having only one output, located at one corner of the network. It should be appreciated that many more than one output may be taken from the network, if desired, and that such multiple output networks are useful as logic circuits. Further, in some practical applications, it may be cheaper to mass produce one particular network such as the one of FIG. 3, for example, to obtain any one or more of logic functions such as 3/7, 4/7, 5/7, 5/8 and so on, than to specifically design a different optimum circuit for each different threshold function. These different functions are available from the circuit of FIG. 3 at the outputs of the gates legended 3/7, 4/7 and so on.

In the case in which $m$, the number of inputs to a gate, is 3, it is possible slightly to simplify the bottom half of the network (the rows below the $(n-t+1)$ row and below the $t$ row (see FIG. 4)). The last gate is eliminated from each alternate row beginning with the $(n-1)$ row and going up. In a row from which a gate has been eliminated, the remaining gate or gates each receive as one input the signal $X_j$, where $j$ is the row from which a gate has been eliminated, as another input the output of the gate in the preceding row and in the diagonal $i+1$, where $i$ is the diagonal on which a gate in question is located, and one output from the gate in the preceding row and in the diagonal $i-1$. The gate or gates in the rows $j+1$ below the rows from which a gate has been eliminated receive as inputs: the signal $X_{j+1}$, the output of the gate in the preceding diagonal $i-1$ and row $j-1$, and the output of the gate in the preceding diagonal $i-1$ and row $j$.

Following the procedure above, the network of FIG. 3, for example, is reduced by two gates. One is eliminated from row 8 and one is eliminated from row 6. The 2/6 gate receives inputs $X_6$, output of 1/5, and output of 3/5; the 4/6 gate receives as inputs $X_6$, output of 3/5, output of 5/5; the 5/6 gate is deleted. The 3/7 gate receives as inputs $X_7$, output of 2/6, output of 2/5, and so on. A disadvantage of optimizing the number of gates in this way is that the network is no longer symmetrical.

What is claimed is:

1. A network for performing a $t$ out of $n$ threshold function comprising a plurality of interconnected $m$ input majority gates, means for applying input signals indicative of input variables to said gates; means for applying fixed inputs indicative of the binary bit "one" to some of said gates; means for applying fixed inputs indicative of the binary bit "zero" to some of said gates; and means for deriving an output from one of said gates indicative of the presence of $t$ out of $n$ inputs to said network, where $t$ and $n$ are integers, and $m$ is an odd integer.

2. An array of $m$ input majority gates for performing a $t$ out of $n$ logic function, said gates being arranged in $i$ diagonals and $j$ rows where:

(1) the range in values of $j$ which are possible is:

$$1 \leq j \leq q+1$$

(2) the range in values of $i$ which are possible is:

$$\max[1, t-(q-j+1)k] \leq i \leq \min[n-(q-j+1)k, t]$$

(3) for $j=1$, the inputs to gate $i$, 1 are:

(*a*) the signals $X_1, X_2 \ldots X_{n-qk}$, where the total number of signals is $n-qk$, (*b*) $(k-i+1)$ constant 1 signals, and (*c*) $[(q+1)k-n+i]$ constant 0 signals:

(4) for $j>1$, the inputs to gate $i$, $j$ are:

(*a*) the $k$ signals $X_{n-(q-j+2)k+1}$, $$X_{n-(q-j+2)k+2} \ldots X_{n-(q-j+2)k+k}$$

(*b*) the outputs from the $k+1$ gates: $(i-k, j-1)$, $(i-k+1, j-1) \ldots (i, j-1)$ (5) in the case in which the values of $i$ and $j$ are such that gates which satisfy the expression in 4*b* above do not exist (because the $i$-value is out of range):

(*a*) whenever the $i$-value is less than 1, supply instead a constant 1 signal, and (*b*) whenever the $i$-value is greater than the $j$ value, supply instead a constant 0 signal (6) in any case where the X input to a gate is the X ouput, that gate may be omitted and said X supplied instead to the gates to which the output of the omitted gate would have been applied:

where:

$n$=total number of inputs to the array
$t$=not more than $n$
$m$=an odd integer $$k=\frac{m-1}{2}$$

$$q=\left[\frac{n-1}{k}\right]$$

where [] implies that if the term is some integer plus a fraction, the fraction is dropped; and the gate at $i=t$, $y=q+1$ produces the desired output $t/n$.

3. An array of three-input gates for performing a $t$ out of $n$ logic function comprising, a plurality of gates arranged in positions electrically corresponding to $n$ rows and $t$ diagonals, the gate at the intersection of the $i$th diagonal and $j$th row, hereafter termed the $ij$ gate, receiving as inputs, a signal indicative of the $j$th one of $n$ input signals, a signal from the gate at the intersection of $i$th diagonal and the $j-1$ row, and a signal from the gate at the intersection of the $i-1$ diagonal and the $j-1$ row, except that in the limiting case in which $i=1$, a signal indicative of the binary bit one rather than a signal from a gate in the $i-1$ diagonal is applied to the $ij$ gate, in the limiting case in which $j=i$, a signal indicative of the binary bit zero is applied to the $ij$ gate rather than a signal from a gate at the $i$ diagonal and $j-1$ row, and in the limiting case in which $j=i=1$, the gate at this intersection may be omitted, and the first one of the $n$ signals applied as inputs to the gates in the second row, where $j$ is a digit from 1 to $n$ and $i$ is a digit from 1 to $t$.

4. An array of gates for performing a $t$ out of $n$ logic function comprising, a plurality of three-input majority gates arranged in positions electrically corresponding to $n$ rows and $t$ diagonals, the first gate on each diagonal being located in the $j$th row in which $j=i$ and the last gate on each diagonal being located in the $j$th row in which $j=n-t+i$, where $j$ is an integer from 1 to $n$ and $i$ is an integer from 1 to $t$ and refers to one of the $t$ diagonals, the gate at the intersection of the $i$th diagonal and $j$th row, hereafter termed the $ij$ gate, receiving as inputs, a signal indicative of the $j$th one of $n$ input signals, a signal from the gate at the intersection of $i$th diagonal and the $j-1$ row, and a signal from the gate at the intersection of the $i-1$ diagonal and the $j-1$ row, except that in the limiting case in which $i=1$, a signal indicative of the binary bit one rather than a signal from a gate in the $i-1$ diagonal is applied to the $ij$ gate, in the limiting case in which $j=i$, a signal indicative of the binary bit zero is applied to the $ij$ gate rather than a signal from a gate at the $i$ diagonal and $j-1$ row, and in the limiting case in which $j=i=1$, the gate at this intersection may be omitted, and the first one of the $n$ signals applied as inputs to the gates in the second row.

5. An array of $m$ input majority gates which is capable of performing $t$ out of $n$ and other threshold logic functions, said gates being arranged in positions electrically corresponding to $i$ diagonals and $j$ rows where:

(1) the range in values of $j$ which are possible is:

$$1 \leq j \leq q+1$$

(2) the range in values of $i$ which are possible is:

$$\max[1,\ t-(q-j+1)k] \leq i \leq \min[n-(q-j+1)k,\ t]$$

(3) for $j=1$, the inputs to gate $i$, 1 are:

(*a*) the signals $X_1, X_2 \ldots X_{n-qk}$, where the total number of signals is $n-qk$, (*b*) $(k-i+1)$ constant 1 signals, and (*c*) $[(q+1)k-n+i]$ constant 0 signals:

(4) for $j>1$, the inputs to gate $i, j$ are:

(*a*) the $k$ signals $X_{n-(q-j+2)k+1}$, $$X_{n-(q-j+2)k+2} \ldots X_{n-(q-j+2)k+k}$$

(*b*) the outputs from the $k+1$ gates: $(i-k, j-1)$, $(1-k+1, j-1) \ldots (i, j-1)$ (5) in the case in which the values of $i$ and $j$ are such that gates which satisfy the expression in 4*b* above do not exist (because the $i$-value is out of range):

(*a*) whenever the $i$-value is less than 1, supply instead a constant 1 signal, and (*b*) whenever the $i$ value is greater than the $j$ value, supply instead a constant 0 signal.

(6) in any case where the X input to a gate is the X output, that gate may be omitted and said X supplied instead to the gates to which the output of the omitted gate would have been applied:

where:

$n$=total number of inputs to the array $t$=not more than $n$ $m$=an odd integer $$k=\frac{m-1}{2}$$

$$q=\left[\frac{n-1}{k}\right]$$

where [] implies that if the term is some integer plus a fraction, the fraction is dropped.

6. A network for performing threshold functions comprising a plurality of interconnected $m$ input majority gates; means for applying input signals indicative of input variables to said gates; means for applying fixed inputs indicative of the binary bit "1" to some of said gates; means for applying fixed inputs indicative of the binary bit "0" to some of said gates; and means for deriving a plurality of concurrent outputs from said network indicative of threshold functions of said input signals in the range one out of two to $t$ out of $n$, where $n$ is an integer which is equal to the number of input variables, $t$ is an integer which is not greater than $n$, and $m$ is an odd integer.

References Cited in the file of this patent

UNITED STATES PATENTS 2,603,746 Burkhart et al. ---------- July 15, 1952

3,088,668 Harel ---------------- May 7, 1963